United States Patent [19]

Germino et al.

[11] 4,059,458

[45] Nov. 22, 1977

[54] OIL-IN-WATER EMULSION CONTAINING STARCH ESTERS

[75] Inventors: Felix Joseph Germino, Palos Park; Francis E. Kite, Riverside; Edwin H. Christensen, Western Springs, all of Ill.

[73] Assignee: CPC International Inc., Englewood Cliffs, N.J.

[21] Appl. No.: 485,049

[22] Filed: July 1, 1974

Related U.S. Application Data

[60] Division of Ser. No. 385,508, Aug. 3, 1973, abandoned, which is a continuation-in-part of Ser. No. 302,463, Oct. 31, 1972, abandoned.

[51] Int. Cl.² .............................................. C08L 3/06
[52] U.S. Cl. ............................ 106/213; 106/244; 252/312; 252/316; 264/7; 424/361; 426/98; 426/605
[58] Field of Search ................ 106/213, 244; 260/233.5; 424/361; 426/96, 98, 604, 605, 651, 661; 264/7; 252/312, 316

[56] References Cited

U.S. PATENT DOCUMENTS

| | | | |
|---|---|---|---|
| 2,363,924 | 11/1944 | Denman | 106/213 |
| 2,461,139 | 2/1949 | Caldwell | 106/213 |
| 2,914,526 | 11/1959 | Paschall | 260/233.5 |
| 2,992,198 | 7/1961 | Funahashi | 106/213 |
| 3,372,050 | 3/1968 | Weber | 106/213 |
| 3,499,962 | 3/1970 | Wurzburg | 426/98 |
| 3,644,332 | 2/1972 | Mooth et al. | 106/213 |
| 3,664,963 | 5/1972 | Pasin | 426/98 |
| 3,764,346 | 10/1973 | Noznick et al. | 426/96 |

*Primary Examiner*—Lorenzo B. Hayes
*Attorney, Agent, or Firm*—David H. LeRoy; John P. Floyd

[57] ABSTRACT

Oil-in-water emulsions containing starch carboxylates as the emulsifying agent. The starch carboxylate imparts improved stability to the emulsions and in the case of salad dressings it can be substituted for all or a portion of the egg content without the loss of any desirable properties.

16 Claims, No Drawings

OIL-IN-WATER EMULSION CONTAINING STARCH ESTERS

This application is a division application of U.S. application Ser. No. 385,508, filed Aug. 3, 1973, which in turn, is a continuation-in-part of prior application Ser. No. 302,463, filed Oct. 31, 1972, both now abandoned.

The present invention relates as indicated to oil-in-water emulsions which contain starch esters. More particularly, it relates to such oil-in-water emulsions wherein the starch ester has a degree of substitution (D.S.) within the range of from about 0.05 to about 1.0.

BACKGROUND OF THE INVENTION

Emulsions are two-phase systems consisting of two incompletely miscible liquids, the one being dispersed as finite globules in the other. The most common emulsions are those of oil and water and there are thus two types of emulsions, viz., those in which oil globules are dispersed in water, and those in which water globules are dispersed in oil. The former are termed "oil-in-water" emulsions and the latter are termed "water-in-oil emulsions". The present invention deals with oil-in-water emulsions, i.e., where water is the continuous phase and oil is the discontinuous phase.

The invention herein is broadly applicable to all oil-in-water emulsions, but it is especially useful in its application to food, pharmaceutical and cosmetic emulsions.

The stability of these emulsions is a very important consideration in any assessment of their overall use. By "stability" of an emulsion is meant its ability to withstand creaming or phase separation. Creaming occurs when the settling or rising of the dispersed particles, with respect to the dispersing medium, becomes apparent by a difference in color shading of the layers formed; the dispersed particles will rise or settle depending upon the difference in the specific gravities of the two phases. Phase separation is said to occur when the dispersed particles have agglomerated and coalesced so that the two phases are completely separated with actual breakdown of the emulsion.

It is apparent that an emulsion, whether it be food, pharmaceutical or cosmetic, must be stable so that it can be stored for long periods of time without change. Otherwise, it is necessary to label the emulsion with some such sales-deterrent instructions as "shake well before using" or, in the extreme situation, the emulsion may be wholly unacceptable because mere shaking is not enough to reform the emulsion. An emulsion which can be stored for six months without losing its character is obviously preferred to an unstable emulsion.

It is accordingly a principal purpose of the present invention to provide stable oil-in-water emulsions.

It is another object of the present invention to provide an improved process for the preparation of flavor and essential oils and lipids in solid form.

It is another object of the present invention to provide improved flavor oil emulsions.

It is also an object of the present invention to provide improved salad dressings.

It is also an object of the present invention to provide an improved spray drying process.

SUMMARY OF THE INVENTION

These and other objects of the invention are accomplished by an oil-in-water emulsion containing a minor proportion of a starch ester having a degree of substitution of from about 0.05 to about 1.0. The particle size of the dispersed oil particles in such emulsion is very small and the emulsion is characterized by markedly improved stability with respect to a similar emulsion containing no starch ester. The starch ester is an ester of at least one aliphatic carboxylic acid having 2–4 carbon atoms, i.e., it may be an acetate, propionate or butyrate, or a mixture of these, e.g., a starch acetate butyrate, starch acetate propionate or starch propionate butyrate. Starch propionate is preferred.

The relative proportion of starch ester to be used in the oil-in-water emulsion may range from about 0.1 to about 30%, based on the weight of the emulsion. Ordinarily, it is most effective at a concentration of from about 0.5% to about 5.0%.

The starch ester may be prepared by the reaction of starch with the appropriate carboxylic anhydride at room temperature. The reaction is carried out in an aqueous slurry in the presence of alkali which reacts with the carboxylic acid as it is formed in the main reaction. Preferably, the pH of the reaction mixture is maintained slightly on the alkaline side, e.g., between about 8.5 and 9.5. External cooling is necessary to maintain the temperature at 30° C. Other known methods of preparation of the starch ester may also be used, i.e., in the presence of a limited amount of water, or by extrusion, etc. The methods of preparation is not part of the invention.

The starch may be derived from any vegetable source including corn, wheat, potato, tapioca, rice, sago and grain sorghum. Waxy starches may be used. Corn starch is a preferred source. The term "starch" is used broadly herein to encompass thick-boiling starch, and starch which has been modified by treatment with acids, alkalis, enzymes or oxidizing agents. Soluble and partially soluble modified starches, dextrins, maltodextrins, low D.E. (<20) starch hydrolysates, pre-gelatinized starches and derivatized starches are also suitable. For certain applications such as in the spray drying of flavor oils where a relatively nonviscous emulsion is desirable, thin-boiling starches are preferred. The thin-boiling starches include acid modified starches as well as oxidized starches such as those prepared by the action of sodium hypochlorite on thick-boiling starch and having a carboxyl (COOH) content of from about 0.25% to about 1.0%; and modified starches having a fluidity value of from about 75 to about 95.

Both granular and pre-gelatinized starches may be used in the preparation of suitable starch esters in the compositions of this invention. So also, the starch may be cross-bonded, either before or after preparation of the starch ester.

Typical examples of the preparation of starch carboxylates are as follows:

EXAMPLE 1

A slurry of 720 g. (4.0 moles) of a thick-boiling starch in 900 ml. of water is prepared. The slurry is agitated and the pH adjusted to 9 by the addition of a 4% aqueous solution of sodium hydroxide. To the stirred slurry there are added 77 ml. (0.59 mole) of propionic anhydride and additional 4% aqueous sodium hydroxide solution, simultaneously, in separate streams. The pH of the slurry is maintained between 8.5 and 9.5. The reaction mixture is cooled as necessary to keep the temperature below 30° C. The addition of the reagents is completed in about 20 minutes, a total of about 800 ml. of aqueous sodium hydroxide being used.

When all of the reagents have been added, the slurry is neutralized to a pH of 6.5 by the addition of 2N aqueous hydrochloric acid. The starch propionate is collected on a filter, washed with water, and dried overnight at 42° C in an air oven. Saponification analysis indicates a degree of substitution (D.S.) of 0.1.

EXAMPLE 2

The procedure of Example 1 is repeated using an oxidized starch having a carboxyl content of 0.47% and a Scott Viscosity of 75 grams/56 seconds, instead of the thick-boiling starch, and using 1.4 moles of propionic anhydride instead of 0.59 mole. The resulting starch propionate has a D.S. of 0.2.

The D.S. of the starch esters herein ranges from about 0.05 to about 1.0. At lower D.S.'s the effectiveness of the starch ester is significantly less than when within the above range. At D.S.'s higher than 0.3, the starch ester tends to be difficult to handle. Starch esters having a D.S. of from about 0.10 to 0.3, and especially from about 0.15 to about 0.3, are preferred because of their particular effectiveness, i.e., their capacity for stabilizing oil-in-water emulsions containing large proportions of oil. The ester groups contributes to the hydrophobic quality of the molecule and a low D.S. starch butyrate will have the same hydrophilic-hydrophobic balance as a higher D.S. starch acetate. A satisfactory oil-in-water emulsion, for example, can be prepared using a starch butyrate having a D.S. of 0.07 as the emulsifying agent.

A typical oil-in-water emulsion of the invention may be prepared by adding 100 parts of corn oil to 100 parts of a 2.8% starch propionate paste, with stirring, and then passing the resulting mixture (twice) through a hand homogenizer. The emulsion which is thus obtained remains stable, i.e., it shows no separation of layers, after 4 days storage at 50° C.

The effectiveness of the starch esters herein as emulsifying agents in oil-in-water emulsions is shown by a simple test wherein a starch paste is prepared having the following composition:

|  | Parts By Weight |
| --- | --- |
| Water | 53.0 |
| Vinegar (100 Grain) | 16.1 |
| Sucrose | 20.2 |
| Salt | 2.8 |
| Cross-Bonded Starch* | 7.5 |

*Unless otherwise specified the cross-bonded starch referred to herein is a corn starch cross-bonded with sodium trimetaphosphate.

The above mixture together with 0.75 part by weight of starch propionate, is cooked until homogeneous. Then while mixing in a Hobart mixer using a wire whip at No. 2 speed, oil is added as fast as it is absorbed. The oil is added until the emulsion breaks, and at this point the amount of oil absorbed (calculated as a percentage of the total emulsion) is observed as a measure of the emulsifying capacity of the starch propionate. In the absence of a starch ester of the type contemplated herein, the amount of oil which can be adsorbed is negligible. Results of the test are shown in Table I.

TABLE I

| Type of Starch Propionate | D. S. | Amount of Oil Adsorbed |
| --- | --- | --- |
| Thick-boiling | 0.083 | 54.1% |
| Thick-boiling | 0.100 | 46.0% |
| Thick-boiling | 0.190 | 55.9% |
| Thick-boiling | 0.300 | 52.1% |
| Oxidized (0.47 COOH) | 0.150 | 58.3% |

TABLE I-continued

| Type of Starch Propionate | D. S. | Amount of Oil Adsorbed |
| --- | --- | --- |
| Oxidized (0.47 COOH) | 0.200 | 52.8% |
| Oxidized (0.48 COOH) | 0.050 | 56.5% |
| Oxidized (0.48 COOH) | 0.200 | 52.8% |
| Acid Modified | 0.230 | 51.9% |
| Oxidized (0.58 COOH) | 0.230 | 45.5% |

It will be seen that, in some instances, more than 50% of the resulting emulsion is oil. This is a very high value, taking into consideration the fact that the starch propionate is the only emulsifying agent present and that it is present only to the extent of 0.75%. The oil may be any of the various vegetable oils, i.e., corn oil, cottonseed oil, castor oil, coconut oil, olive oil, peanut oil, lard oil, linseed oil, palm oil, safflower oil, and the like.

ESSENTIAL FLAVOR OIL EMULSIONS

A principal use of the present invention is in the preparation of essential flavor oil emulsions. Such emulsions are used to prepare essential flavor oils in powder form. The availability of such powder form makes them easier to use in the preparation of powder formulations. The powder form of a flavor oil is prepared by first making up an aqueous emulsion containing the oil and an "enrobing" material such as a low D.E. starch hydrolysate, i.e., one having a D.E. less than 20. An emulsifying agent is also present to insure the small particle size of the oil. This emulsion is then spray dried and the enrobed oil collected as a powder. That is, the solids consist of minute oil particles encapsulated (or enrobed) in the starch hydrolysate. The better the emulsion, the smaller the particle size of the dispersed oil particles, and the more complete is the encapsulation process during the spray drying. Further, the more complete this encapsulation process, the greater is the yield of the spray dried oil. Inasmuch as the oil frequently is relatively volatile, some invariably is lost by evaporation in the spray drying process and it is important to minimize this loss.

The effectiveness of the starch esters herein as emulsifying agents in the above process is shown by spray drying tests carried out on emulsions having the following composition:

|  | Parts By Weight |
| --- | --- |
| Water | 47.6 |
| Starch Hydrolysate (12 D.E.) | 37.9 |
| Orange Oil | 10.5 |
| Starch Propionate | 4.0 |

These compositions are prepared by cooking the starch propionate in water at 185° F., then dissolving the starch hydrolysate in the resulting paste and cooling it to 80° F. The orange oil is mixed in and homogenized in a hand homogenizer. The resulting emulsion is spray dried in a Bowen laboratory spray dryer at a feed rate of 50–60 ml./min., using the spinning disc nozzle at 60 psi air pressure. An outlet air temperature of 180°–190° F. is maintained. The resulting powder is analyzed for oil content and the percentage of oil retained is calculated. The results are shown in Table II.

TABLE II

| Type of Starch Propionate | D. S. | % of Oil Recovered |
| --- | --- | --- |
| Acid-Modified | 0.230 | 83.3 |
| Acid-Modified | 0.160 | 79.0 |
| Acid-Modified | 0.113 | 77.5 |
| Oxidized Starch (0.58 COOH) | 0.230 | 83.5 |

TABLE II-continued

| Type of Starch Propionate | D. S. | % of Oil Recovered |
|---|---|---|
| Oxidized Starch (0.47 COOH) | 0.200 | 78.5 |

Other oils and essential flavor oils likewise are susceptible to this type of treatment so as to produce powder products, including lemon, tangerine, lime, nutmeg, peppermint, marjoram, thyme, spearmint and wintergreen oils.

The relative proportion of starch ester to be used in such essential flavor oil emulsions ranges from about 1.0% to about 30%. The oil-in-water emulsion should contain, for efficient operation, from about 5% to about 30% of the essential flavor oil.

It is, preferable, of course, to use a high concentration of solids in the emulsion being spray dried, consistent with a workable viscosity. In this connection, as indicated earlier, it is preferred to use a thin-boiling starch ester, such as a modified starch or an oxidized starch, because it provides an emulsion having a relatively low viscosity. The use of a thick-boiling starch ester on the other hand gives an emulsion of higher viscosity and, therefore, one which is more difficult to spray dry.

If no emulsifying agent at all is used, then of course no emulsion results and it is futile to spray dry such a composition. Very little of the volatile flavor oil would be recovered.

SPOONABLE DRESSINGS

The starch esters herein are useful also in the preparation of spoonable dressings, i.e., salad dressings and the like. Spoonable dressings ordinarily contain eggs or egg yolks and a cross-linked starch which imparts the desired viscosity and texture to the composition. Starch esters enable the preparation of eggless salad dressings containing as much as 30% of oil and they act to supplement the effectiveness of egg yolks in salad dressings containing larger amounts of oil. This effectiveness is shown by the results of colloid milling tests of oil-in-water emulsions as follows:

TABLE III

| Starch Propionate | % Salted Egg Yolk | % Oil | Emulsion Condition Immediately after Colloid Milling at Indicated Clearance[a] | Emulsion Condition After 6 Days |
|---|---|---|---|---|
| No. 1 — 2.0% | 0 | 30 | 0.040" OK[c] | OK |
| | | | 0.035" OK | OK |
| | | | 0.030" OK | OK |
| | | | 0.025" OK | OK |
| | | | 0.020" OK | OK |
| | | | 0.015" OK | OK |
| No. 2 — 1.0% | 0 | 30 | 0.040" OK | OK |
| | | | 0.035" OK | OK |
| | | | 0.030" OK | OK |
| | | | 0.025" BL[b] | BL |
| | | | 0.020" Broke | Broke |
| No. 3 — 2.0% | 4.5 | 45 | 0.047" BL | Broke |
| | | | 0.045" Broke | Broke |
| | | | 0.040" Broke | Broke |
| No. 4 — 3.0% | 4.5 | 45 | 0.047"BL | Broke |
| | | | 0.045" BL | BL |
| No. 5 — 2.0% | 0 | 30 | 0.045" OK | OK |
| | | | 0.040" OK | OK |
| | | | 0.035" OK | OK |
| | | | 0.030" OK | OK |
| | | | 0.025" OK | OK |
| | | | 0.020" OK | OK |
| | | | 0.015" OK | OK |
| No. 6 — 2.0% | 4.5 | 45 | 0.045" OK | OK |
| | | | 0.040" BL | OK |
| | | | 0.035" BL | OK |
| No. 7 — 3.0% | 4.5 | 45 | 0.047" OK | OK |
| | | | 0.045" OK | OK |
| | | | 0.040" OK | OK |
| | | | 0.035" OK | OK |
| | | | 0.030" OK | OK |
| No. 8 — 2.0% | 4.5 | 45 | 0.045" OK | OK |
| | | | 0.040" OK | OK |
| | | | 0.035" OK | OK |
| | | | 0.030" OK | OK |
| | | | 0.025" OK | OK |
| | | | 0.020" BL | BL |
| No. 9 — 1.0% | 4.5 | 45 | 0.045" OK | OK |
| | | | 0.040" BL | Broken |
| | | | 0.035" BL | Broken |
| No. 10 — 2.0% | 4.5 | 45 | 0.045" OK | OK |
| | | | 0.040" OK | OK |
| | | | 0.035" OK | OK |
| | | | 0.030" OK | OK |
| | | | 0.025" OK | OK |
| | | | 0.020" BL | BL |
| No. 11 — 1.0% | 4.5 | 45 | 0.045" OK | OK |
| | | | 0.040" OK | OK |
| | | | 0.035" OK | OK |
| | | | 0.030" BL | Broken |
| No. 12 — 2.0% | 4.5 | 45 | 0.045" OK | OK |
| | | | 0.040" OK | OK |
| | | | 0.035" OK | OK |
| | | | 0.030" OK | OK |
| | | | 0.025" OK | OK |
| | | | 0.020" OK | OK |
| No. 13 — 1.0% | 4.5 | 45 | 0.045" OK | OK |
| | | | 0.040" OK | OK |
| | | | 0.035" OK | OK |
| | | | 0.030" BL | BL |
| | | | 0.025" BL | Broken |
| No. 14 — 2.0% | 4.5 | 45 | 0.045" OK | OK |
| | | | 0.040" OK | OK |
| | | | 0.035" OK | OK |
| | | | 0.025" OK | OK |
| | | | 0.020" OK | OK |
| No. 15 — 1.0% | 4.5 | 45 | 0.045" OK | OK |
| | | | 0.040' OK | OK |
| | | | 0.035" BL | OK |
| | | | 0.030" Broke | Broken |
| No. 16 — 2.0% | 4.5 | 45 | 0.045" OK | OK |
| | | | 0.040" OK | OK |
| | | | 0.035" OK | OK |
| | | | 0.030" OK | OK |
| | | | 0.025" OK | OK |
| | | | 0.020" BL | BL |
| No. 17 — 1.0% | 4.5 | 45 | 0.045" OK | OK |
| | | | 0.040" OK | OK |
| | | | 0.035" BL | OK |
| | | | 0.030" BL | BL |
| No. 18 — 2.0% | 4.5 | 45 | 0.045" OK | OK |
| | | | 0.040" OK | OK |
| | | | 0.035" OK | OK |
| | | | 0.030" OK | OK |
| | | | 0.025" OK | OK |
| | | | 0.020" OK | OK |
| No. 19 — 1.0% | 4.5 | 45 | 0.045" OK | OK |
| | | | 0.040" OK | OK |
| | | | 0.035" OK | OK |
| | | | 0.030" BL | BL |
| No. 20 — 2.0% | 4.5 | 45 | 0.045" OK | OK |
| | | | 0.040" OK | OK |
| | | | 0.035" OK | OK |
| | | | 0.030" OK | OK |
| | | | 0.025" OK | OK |
| | | | 0.020" OK | OK |
| No. 21 — 1.0% | 4.5 | 45 | 0.040" OK | OK |
| | | | 0.035" OK | OK |
| | | | 0.030" OK | OK |
| | | | 0.025" BL | BL |
| | | | 0.020" Broken | Broken |
| No. 22 — none | 2.2 | 30 | 0.047" Broken | Broken |
| No. 23 — none | 4.5 | 45 | 0.047" Broken | Broken |

[a]A Charlotte colloid mill is used at a throughput rate of 4 lbs./min., see Perr-, "Chemical Engineer's Handbook", page 1169, McGraw Hill, 3rd Ed., 1950.
[b]Borderline
[c]No separation The above emulsions are prepared by blending the desired quantities of starch paste with oil and egg yolk (if any). The starch paste is placed in a Hobart blender, egg yolk is blended in using a wire whip at No. 2 speed, followed by the oil. The oil is added as quickly as possible and then the entire mixture is fed into a Charlotte colloid mill at a rate of 30 gallons per hour. The colloid mill spacings are varied from 0.047 inch down to as low as 0.015 inch, in 0.005 inch increments, until the level of spacing is found at which the emulsion breaks.

The particular starch propionates used in the oil-in-water emulsion of Table III are as follows:

TABLE IV

| | | D. S. |
|---|---|---|
| No. 1 | Thick-boiling starch propionate | 0.09 |
| No. 2 | Thick-boiling starch propionate | 0.09 |
| No. 3 | Thick-boiling starch propionate | 0.09 |
| No. 4 | Thick-boiling starch propionate | 0.09 |
| No. 5 | Thick-boiling starch propionate | 0.11 |
| No. 6 | Thick-boiling starch propionate | 0.11 |
| No. 7 | Thick-boiling starch propionate | 0.11 |
| No. 8 | Acid-modified starch propionate | 0.11 |
| No. 9 | Acid-modified starch propionate | 0.11 |
| No. 10 | Acid-modified starch propionate | 0.15 |
| No. 11 | Acid-modified starch propionate | 0.15 |
| No. 12 | Acid-modified starch propionate | 0.23 |
| No. 13 | Acid-modified starch propionate | 0.23 |
| No. 14 | Oxidized starch propionate (0.58% COOH) | 0.23 |
| No. 15 | Oxidized starch propionate (0.58% COOH) | 0.23 |
| No. 16 | Oxidized starch propionate (0.47% COOH) | 0.22 |
| No. 17 | Oxidized starch propionate (0.47% COOH) | 0.22 |
| No. 18 | Oxidized starch propionate (0.47% COOH) | 0.15 |
| No. 19 | Oxidized starch propionate (0.47% COOH) | 0.15 |
| No. 20 | Oxidized starch propionate (0.58% COOH) | 0.20 |
| No. 21 | Oxidized starch propionate (0.58% COOH) | 0.20 |
| No. 22 | None | |
| No. 23 | None | |

The compositions of the starch pastes used to prepare the oil-in-water emulsions of Table III are as follows:

TABLE V

| | No. 1 | No. 2 | No. 3 | No. 4 | No. 5 | No. 6 | No. 7 |
|---|---|---|---|---|---|---|---|
| Water | 52.2 | 52.9 | 52.0 | 50.4 | 52.2 | 52.0 | 50.4 |
| Vinegar (100 grain) | 15.7 | 15.9 | 15.7 | 15.2 | 15.7 | 15.7 | 15.2 |
| Sucrose | 20.2 | 20.2 | 20.2 | 20.2 | 20.2 | 20.2 | 20.2 |
| Salt | 2.8 | 2.8 | 2.8 | 2.8 | 2.8 | 2.8 | 2.8 |
| Cross-bonded starch | 6.2 | 6.8 | 5.7 | 5.9 | 6.2 | 5.7 | 5.9 |
| Starch propionate | 2.9 | 1.4 | 3.6 | 5.5 | 2.9 | 3.6 | 5.5 |

| | Nos. 8, 10, 12, 14, 16, 18, 20 | Nos. 9, 11, 13, 15, 17, 19, 21 | Nos. 22, 23 |
|---|---|---|---|
| Water | 50.6 | 52.0 | 53.4 |
| Vinegar (100 grain) | 15.3 | 15.7 | 16.1 |
| Sucrose | 20.2 | 20.2 | 20.2 |
| Salt | 2.8 | 2.8 | 2.8 |
| Cross-bonded starch | 7.5 | 7.5 | 7.5 |
| Starch propionate | 3.6 | 1.8 | — |

The above starch pastes are prepared by mixing the ingredients in the indicated amounts, heating at 200°–205° F for about 10 minutes and cooling to 80° F.

Referring to the test data of Table III, it will be seen (see No. 1) that eggless salad dressings containing 30% oil can be made sufficiently stable as to pass through a Charlotte colloid mill with spacings as low as 0.015 inch, using 2% of a thick-boiling starch propionate as the emulsifying component. The use of 1% of the same starch propionate resulted in an eggless salad dressing containing 30% oil which passed through mill spacings of 0.030 inch.

POURABLE DRESSINGS

Pourable dressings, i.e., pourable salad dressings, likewise are benefited by the addition of the starch esters herein. Here again, they serve to supplement a portion of the normal egg content of the salad dressing and, also, as a replacement at least in part for the normally used thickener. Such thickener usually is a gum such as gum tragacanth.

Gum tragacanth serves as indicated to impart desired viscosity to pourable dressings; it serves also to a minor extent to stabilize the emulsion. The starch esters of this invention are effective for the same purposes, and being significantly cheaper than gum tragacanth, their substitution for a portion of this more costly ingredient makes possible the formulation of a pourable dressing at less cost without a reduction in the quality of the dressing. This is shown by the data contained in Table VI.

TABLE VI

POURABLE DRESSINGS CONTAINING GRANULAR STARCH PROPIONATE

| | Size of Dispersed Fat Globules (u) | H₂O Separation, m./100 ml. | | | |
|---|---|---|---|---|---|
| | | At Room Temperature 6 Weeks | 3 mos. | At 120° F. 4 weeks | 3 mos. |
| Pourable dressing | 50–60 | 0 | 0 | 0 | 16 |
| Pourable dressing minus the egg yolk | 60–200 | 0 | 0 | 0 | 8 |
| Pourable dressing containing only 0.10 part tragacanth + 0.50 part thick-boiling starch propionate | 60–200 | 0 | 0 | 0 | 8 |
| Pourable dressing containing 0.75 part thick-boiling starch propionate but no gum tragacanth or egg yolk | 30–60 | 0 | 1 | 2 | 7 |

The pourable dressings in Tables VI and VII are based on the following composition which in each table, corresponds to the first listed dressing:

| | Parts |
|---|---|
| Oil | 35.34 |
| Cider Vinegar (50 grain) | 17.00 |
| Sugar | 18.40 |
| Water | 9.75 |
| Lemon Juice | 7.00 |
| Tomato Paste | 7.00 |
| Salt | 2.50 |
| Spices | 2.50 |
| Egg Yolk | 0.18 |
| Gum Tragacanth | 0.33 |

It will be seen from a consideration of the data set forth in Tables VI and VII that the substitution of starch propionate for more than two thirds of the gum tragacanth produces a pourable dressing having the same thickening properties as that which contained only gum tragacanth.

Egg yolk likewise is ordinarily an ingredient in salad dressings. It also is expensive, although necessary to provide additional desired stabilization. The substitution of starch propionate for egg yolk does not diminish the desirable qualities of a salad dressing and, of course, diminishes the cost of the dressing.

Pre-gelatinized starch propionates likewise are effective in pourable dressings. Like their granular counterparts they act to stabilize the emulsion and to replace all or a part of the egg yolk component. They can also be substituted for at least a portion of xanthan gum which is another commonly used thickening agent in pourable dressings. This is shown by the data in Table VII.

| 1% | isopropyl palmitate (emollient) |
| 1.5% | polyoxyethylene sorbitan monostearate (emulsifier) |
| 2% | sorbitan monostearate (consistency emulsifier) |
| 15% | stearic acid (emollient) |
| 76.9% | water | plus a humectant and preservative. Substitution of 1% of a starch propionate (D.S. of 0.1 or 0.3) for the polyoxyethylene sorbitan monostearate emulsifier produces a satisfactory hand cream, i.e., one which is stable on storage for 7 days.

Still another application in which the starch esters of this invention are useful is the preparation of free-flowing lipids by means of encapsulation. In a typical formulation (below) the oil is dispersed

|  | Parts By Weight |
|---|---|
| Water | 3,000 |

Table VII

POURABLE SALAD DRESSINGS CONTAINING PREGELANTINIZED STARCH PROPIONATE

| Stabilizing Ingredient | Parts | Fat Size, μ | Viscosity - Brooffield, cps. 24 Hours | 1 Week | 3 Weeks | 6 Weeks | 3 Mos. | Water Separation, ml./100 ml. at RT 4 Weeks | 6 Weeks | 2 Mos. | at 120° F. 4 Weeks | 6 Weeks | 3 Mos. |
|---|---|---|---|---|---|---|---|---|---|---|---|---|---|
| Gum Tragacanth | 0.33 | 6–45 | 3013 | 3410 | 3785 | 3840 | H₂O Sep. | 0 | 0 | 1 | 2 | 6 | 17 |
| Egg Yolk | 0.18 | | | | | | | | | | | | |
| Gum Tragacanth | 0.25 | 6–45 | 3387 | 3680 | 3720 | 3715 | H₂O Sep. | 0 | 0 | 2 | 0 | 2 | 11 |
| Thick-Boiling starch propionate | 0.25 | | | | | | | | | | | | |
| Gum Tragacanth | 0.25 | 3–30 | 3627 | 3970 | 3935 | 3755 | H₂O Sep. | 0 | 0 | 1 | 0 | 0 | 13 |
| Cross-Linked Thick-Boiling Starch Propionate | 0.25 | | | | | | | | | | | | |
| Xanthan Gum | 0.25 | 6–30 | 5121 | 5020 | 4190 | 4805 | 4180 | 0 | 0 | 0 | 0 | 0 | 0 |
| Xanthan Gum | 0.25 | 3–40 | 5890 | 5860 | 5740 | 5620 | 3555 | 0 | 0 | 0 | 0 | 0 | 0 |
| Egg Yolk | 0.18 | | | | | | | | | | | | |
| Xanthan Gum | 0.15 | 6–30 | 6747 | 6500 | 6125 | 5915 | 5065 | 0 | 0 | 0 | 0 | 0 | 0 |
| Thick-Boiling Starch Propionate | 0.25 | | | | | | | | | | | | |
| Xanthan Gum | 0.15 | 6–30 | 4513 | 4410 | 4305 | 4085 | 3505 | 0 | 0 | 0 | 0 | 0 | 0 |
| Cross-Linked Thick-Boiling Starch Propionate | 0.25 | | | | | | | | | | | | |
| Xanthan Gum | 0.15 | 6–30 | 5483 | 5085 | 4845 | 4815 | 3910 | 0 | 0 | 0 | 0 | 0 | 0 |
| Thick-Boiling Starch Propionate | 0.25 | | | | | | | | | | | | |
| Cross-Linked Waxy Starch | 0.50 | 3–25 | 2460 | 2590 | 2070 | 2300 | H₂O Sep. | 8 | 10 | 13 | 12 | 14 | 22 |
| Thick-boiling Starch Propionate | 0.25 | | | | | | | | | | | | |
| Cross-Linked Waxy Starch | 0.50 | 6–70 | 1750 | 1850 | 1570 | 1640 | H₂O Sep. | 4 | 7 | 17 | 13 | 16 | 23 |
| Cross-Linked Thick Boiling Starch Propionate | 0.25 | | | | | | | | | | | | |
| Cross-Linked Waxy Starch | 0.50 | 6–30 | 2380 | 2410 | 1650 | 2170 | H₂O Sep. | 6 | 10 | 19 | 11 | 14 | 22 |
| Thick-Boiling Starch Propionate | 0.25 | | | | | | | | | | | | |
| Gum Tragacanth + Egg Yolk | 0.33 0.18 | 3–35 | 3693 | 3890 | 4097 | 3863 | 4390 | 0 | 0 | 0 | 0 | 2 | 18 |
| Gum Tragacanth No Egg Yolk | 0.33 | 6–50 | 3423 | 3267 | 3410 | 3277 | 3175 | 0 | 0 | 1.0 | 3 | 5 | 17 |
| Gum Tragacanth | 0.25 | 3–35 | 3480 | 3207 | 3327 | 2830 | 2980 | 0 | 0 | 0 | 0 | 2 | 13 |
| Thick-Boiling Starch Propionate | 0.25 | | | | | | | | | | | | |
| Xanthan Gum | 0.15 | 3–15 | 4267 | 3807 | 3877 | 3600 | 4190 | 0 | 0 | 0 | 0 | 0 | 0 |
| Egg Yolk | 0.18 | | | | | | | | | | | | |
| Xanthan Gum | 0.20 | 3–30 | 4740 | 4543 | 4337 | 4057 | 4100 | 0 | 0 | 0 | 0 | 0 | 0 |
| Xanthan Gum | 0.075 | 3–50 | 3375 | 3050 | 2895 | 2350 | — | 0 | 0 | 0 | 0 | 0 | 5 |
| Thick-Boiling Starch Propionate | 0.25 | | | | | | | | | | | | |
| Xanthan Gum | 0.075 | 3–30 | 2987 | 2930 | 2600 | 3370 | 3370 | 0 | 0 | 0 | 0 | 0 | 7 |
| Thick-Boiling Starch Propionate | 0.125 | | | | | | | | | | | | |
| Cross-Linked Waxy Starch | 0.50 | 3–50 | 2460 | 2330 | 2267 | 2063 | 1795 | 3 | 3 | 7 | 13.7 | 6 | 19 |
| Thick-Boiling Starch Propionate | 0.25 | | | | | | | | | | | | |

As indicated, the starch esters herein are useful in the formulation of cosmetic preparations. Typically, a hand cream will contain the following ingredients:

| | |
|---|---|
| 92° F Coconut Oil | 1,000 |
| Starch* Hydrolysate (12 D.E.) | 944 |

| | Parts By Weight |
|---|---|
| Starch Propionate (0.22 D.S.) | 56 |

*acid modified in an aqueous emulsion containing a low D.E. starch hydrolysate as an encapsulating material and a starch ester as the emulsifying agent. The emulsion is spray dried to give a free-flowing lipid powder. Other illustrative lipids which may be thus encapsulated to form free-flowing powders include corn oil, cottonseed oil, soybean oil, olive oil and their hydrogenation products.

The starch esters of this invention are useful also in the formulation of icings such as butter cream icings where their superior emulsifying properties result in icings which have improved stability. Thus, when spread on a cake and allowed to stand 36 hours, an icing containing 2% of an oxidized (0.58% COOH) starch propionate shows a marble-type finish of good color and gloss which can be sliced easily with a knife. A similar icing containing 1% of sorbitan monostearate plus 2% of mixed mono- (40–44%) and diglycerides of animal fatty acids (mainly stearic, palmitic and oleic), under the same conditions, yields a foamy texture.

They are useful also in cake formulations where they are effective to replace a portion of the normal egg content of the cake without substantial loss of the cake's desirable properties.

They are useful also in the formulation of whipped toppings, i.e., substitutes for whipped cream. A standard whipped topping formulation containing 0.5% of hydroxypropyl cellulose, which is commonly used as an ingredient to retard thickening, starts to thicken after 6 days storage at 40° F, and is completely non-fluid after 7 days; whereas an identical formulation containing 0.5% of an oxidized starch propionate (0.58% COOH; 0.23 D.S) instead of the hydroxypropyl cellulose, does not start to thicken until after 16 days, and is still fluid after 36 days. The formulations are shaken frequently to accelerate thickening.

All parts and percentages herein are by weight unless otherwise expressly stated.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:
1. A stable oil-in-water emulsion which comprises:
   a. a continuous aqueous phase;
   b. a discontinuous phase emulsified in said continuous phase comprising an oil or lipid; and
   c. an emulsifying agent for maintaining said stable oil-in-water emulsion consisting essentially of a starch ester of at least one aliphatic carboxylic acid having 2 – 4 carbons having a degree of substitution of from about 0.05 to about 1.0.

2. The oil-in-water emulsion of claim 1 wherein the oil content of the emulsion is from about 10% to about 75%.

3. The oil-in-water emulsion of claim 1 wherein the degree of substitution of the starch ester is from about 0.15 to about 0.30.

4. The oil-in-water emulsion of claim 1 wherein the concentration of starch ester is from about 0.1% to about 30%.

5. The oil-in-water emulsion of claim 1 wherein the starch ester is a corn starch propionate.

6. The oil-in-water emulsion of claim 5 wherein the starch propionate is a thick-boiling starch propionate.

7. The oil-in-water emulsion of claim 5 wherein the starch propionate is a thin-boiling starch propionate.

8. The oil-in-water emulsion of claim 5 wherein the starch propionate is an oxidized starch propionate.

9. The oil-in-water emulsion of claim 5 wherein the starch propionate is a modified starch.

10. A process for the preparation of an encapsulated lipid or oil in powdered form comprising the steps:
    A. preparing a stabilized lipid or oil-in-water emulsion by homogenizing a mixture comprising:
       1. a continuous aqueous phase,
       2. a discontinuous phase comprising a lipid or oil,
       3. an enrobing or encapsulating material for said lipid or oil comprising a starch hydrolysate having a D.E. less than about 20, and
       4. an emulsifying agent for maintaining stability to said lipid or oil-in-water emulsion consisting essentially of a starch ester of at least one aliphatic carboxylic acid having 2 – 4 carbon atoms, said starch ester having a degree of substitution of from about 0.05 to about 1.0, said starch ester being present in an amount ranging from about 1.0% to about 30%; and
    B. spray drying said stabilized lipid or oil-in-water emulsion to thereby form a free-flowing lipid or oil powder.

11. The process of claim 10, wherein the discontinuous phase is present in an amount ranging from about 5% to about 30%.

12. The process of claim 10, wherein the discontinuous phase is an essential flavor oil.

13. The process of claim 10, wherein said discontinuous phase is a lipid selected from the group consisting of coconut oil, corn oil, cottonseed oil, soybean oil, olive oil and their hydrogenation products.

14. The process of claim 10, wherein the starch ester is a thin boiling starch propionate.

15. The process of claim 10, wherein the starch ester is an oxidized starch propionate.

16. An encapsulated lipid or oil produced by the process of claim 10.

* * * * *